US008478777B2

(12) United States Patent
Li et al.

(10) Patent No.: US 8,478,777 B2
(45) Date of Patent: Jul. 2, 2013

(54) GESTURE-BASED SEARCH

(75) Inventors: Yang Li, Palo Alto, CA (US); Leo Chiow-Fuan Ting, Sunnyvale, CA (US); Rui Ueyama, Mountain View, CA (US); Lawrence Chang, Foster City, CA (US); Younghun An, San Jose, CA (US)

(73) Assignee: Google Inc., Mountain View, CA (US)

(*) Notice: Subject to any disclaimer, the term of this patent is extended or adjusted under 35 U.S.C. 154(b) by 69 days.

(21) Appl. No.: 13/280,582

(22) Filed: Oct. 25, 2011

(65) Prior Publication Data
US 2013/0103712 A1    Apr. 25, 2013

(51) Int. Cl.
*G06F 17/30* (2006.01)
(52) U.S. Cl.
USPC .......................................................... 707/769
(58) Field of Classification Search
None
See application file for complete search history.

(56) References Cited

U.S. PATENT DOCUMENTS

| | | | | |
|---|---|---|---|---|
| 4,972,496 A * | 11/1990 | Sklarew | ........................ | 382/187 |
| 4,988,981 A * | 1/1991 | Zimmerman et al. | ........ | 345/158 |
| 5,252,951 A * | 10/1993 | Tannenbaum et al. | ........ | 345/156 |
| 5,428,692 A * | 6/1995 | Kuehl | ........................... | 382/204 |
| 5,500,937 A * | 3/1996 | Thompson-Rohrlich | ..... | 715/764 |
| 5,864,635 A * | 1/1999 | Zetts et al. | .................... | 382/187 |
| 5,923,793 A * | 7/1999 | Ikebata | ......................... | 382/311 |
| 6,057,845 A * | 5/2000 | Dupouy | ........................ | 715/863 |
| 6,407,679 B1 * | 6/2002 | Evans et al. | ..................... | 341/20 |
| 6,493,464 B1 * | 12/2002 | Hawkins et al. | .............. | 382/189 |
| 6,573,883 B1 * | 6/2003 | Bartlett | .......................... | 345/156 |
| 6,791,537 B1 * | 9/2004 | Shim et al. | ..................... | 345/173 |
| 7,002,560 B2 * | 2/2006 | Graham | ......................... | 345/179 |
| 7,372,993 B2 * | 5/2008 | Lagardere et al. | ............ | 382/186 |
| 2005/0111736 A1 * | 5/2005 | Hullender et al. | ............ | 382/188 |
| 2005/0210402 A1 * | 9/2005 | Gunn et al. | .................... | 715/773 |
| 2006/0095504 A1 | 5/2006 | Gelsey | | |
| 2006/0233464 A1 * | 10/2006 | Simmons | ....................... | 382/321 |
| 2006/0288313 A1 * | 12/2006 | Hillis | ............................. | 715/863 |
| 2007/0177803 A1 * | 8/2007 | Elias et al. | ..................... | 382/188 |
| 2007/0273674 A1 * | 11/2007 | Cohen et al. | ................... | 345/179 |
| 2008/0104020 A1 | 5/2008 | Kato | | |
| 2008/0137971 A1 * | 6/2008 | King et al. | ..................... | 382/229 |
| 2009/0003658 A1 * | 1/2009 | Zhang et al. | ................... | 382/113 |
| 2009/0040215 A1 * | 2/2009 | Afzulpurkar et al. | ......... | 345/419 |
| 2009/0058820 A1 * | 3/2009 | Hinckley | ....................... | 345/173 |
| 2010/0097322 A1 * | 4/2010 | Hu et al. | ....................... | 345/173 |
| 2010/0262905 A1 | 10/2010 | Li | | |
| 2010/0318696 A1 * | 12/2010 | Ruotslainen | ..................... | 710/67 |
| 2011/0066984 A1 * | 3/2011 | Li | ................................. | 715/863 |
| 2011/0291940 A1 * | 12/2011 | Ghassabian | .................... | 345/169 |

OTHER PUBLICATIONS

Notification of Transmittal of the International Search Report and the Written Opinion of the International Searching Authority or the Declaration, issued in PCT/US2012/061258 on Feb. 5, 2013, 11 pages.
Raphael, J.R., "Google's Android Gesture Search: A Fingers-On Tour," PC World Mar. 4, 2010, 2 pages, retrieved from the internet on Jan. 24, 2013: URL:http://www.pcworld.com/article/190824/Googles_Android_Gesture_A_FingersOn_Tour.html.
"About Google Instant," Sep. 12, 2011, 2 pages, retrieved from the internet on Jan. 24, 2013; URL:http://web.archive.org/web/20110912180533/htpp://www.google.co.uk/instant/.

* cited by examiner

*Primary Examiner* — Bai D. Vu
(74) *Attorney, Agent, or Firm* — Fish & Richardson P.C.

(57) ABSTRACT

In general, the subject matter described in this specification can be embodied in methods, systems, and program products for performing searches with gesture-based input. A search system receives gesture data corresponding to one or more characters that have been drawn on a display of a client device. The search system recognizes the one or more characters that correspond to the gesture data. The search system formulates a search that includes the one or more characters as a query term. The search system communicates to the client device one or more search results for the search, and data identifying the one or more characters.

15 Claims, 10 Drawing Sheets

GESTURE-BASED SEARCH

BACKGROUND

This specification relates to search engines, and one particular implementation relates to searches that are performed using input received through a display of a user device.

One example of a search is a web-based instant search that returns search results as the user is entering information, e.g., an instant search. The search results of an instant search are typically updated as the user enters additional information.

SUMMARY

The present disclosure describes systems and techniques by which information may be exchanged over a network between a user device and a search system to facilitate a search. In one implementation, the search is initiated when a user draws a pattern, e.g., a pattern corresponding to a character, glyph, or a letter of a language, on a display of the user device. The user device collects gesture data related to the pattern drawn by the user, and sends the gesture data along with any previously recognized characters that constitute a search term, to the search system.

The search system recognizes a new character based on the gesture data, and updates the search term by aggregating the newly recognized character with the previously recognized characters. The search system then generates updated search results based on the updated search term. The search system returns the updated search term and the updated search results to the user device, and the user device presents the updated search term and the updated search results on its display.

In general, one aspect of the subject matter described in this specification may be embodied in a computer-implemented method that includes a search system receiving gesture data corresponding to one or more characters that have been drawn on a display of a client device. The search system recognizes the one or more characters that correspond to the gesture data. The search system formulates a search that includes the one or more characters as a query term. The search system communicates to the client device one or more search results for the search, and data identifying the one or more characters.

Other embodiments of this aspect include corresponding systems and computer program products. The system includes a client device and one or more computers operable to interact with the client device and to perform the above listed actions.

These and other embodiments may optionally include one or more of the following features. The gesture data may be received before a user of the client device initiates the search. The search system may receive data identifying one or more other characters that were previously recognized by the search system before the gesture data corresponding to the one or more characters were received. The search system may communicate data identifying the one or more other characters. The gesture data may include a point map that identifies points on the display on which the one or more characters were drawn, and specifies a sequence in which the points on the display were drawn on. The search may be an instant search, or an image search.

In general, another aspect of the subject matter described in this specification may be embodied in a computer-implemented method that includes a client device generating gesture data corresponding to one or more characters that have been drawn on a display of the client device. The client device transmits the gesture data to a search system. The client device receives search results that have been identified by the search system using a search that includes the one or more characters, and data identifying the one or more characters. The client device displays the search results.

These and other embodiments may optionally include one or more of the following features. The client device may determine that a control object is no longer contacting the display of the client device. The gesture data may be generated in response to determining that the control object is no longer contacting the display of the client device. The client device may display a search term based on receiving the data identifying the one or more characters. The client device may detect that the user has initiated a search and determine that the user has drawn a pattern on the display of the client device.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
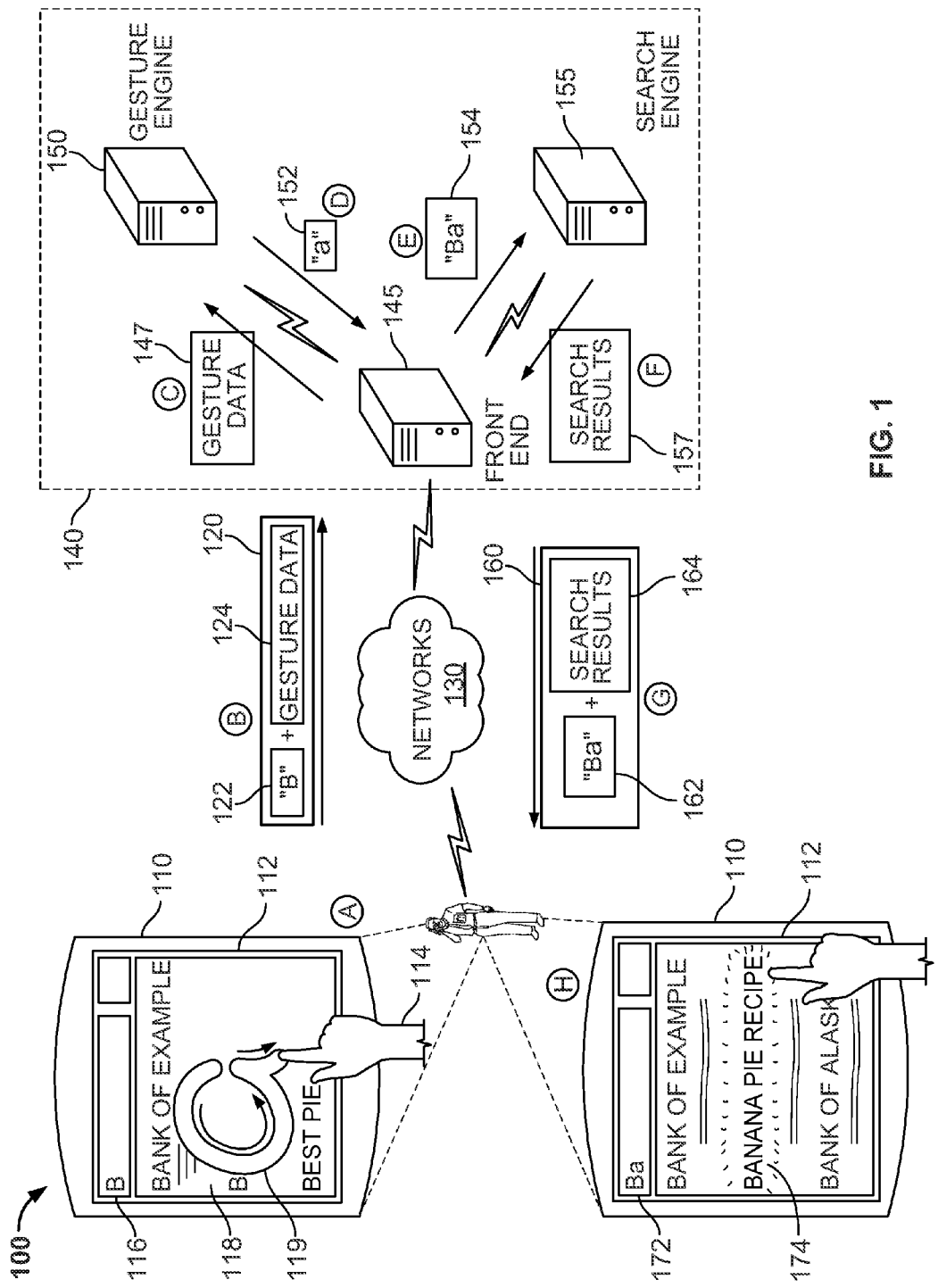
FIG. 1 illustrates a system that performs a search based on patterns that a user draws on a display of a user device.

FIG. 1 illustrates a system 100 that performs a search based on patterns that a user draws on a display of a user device 110. The system 100 is an example of an information retrieval system in which the systems, components, and techniques described below may be implemented. FIG. 1 also illustrates a flow of data through the components of the system 100 during states (A) to (H). States (A) to (H) may occur in the illustrated sequence, or in a sequence that is different from the illustrated sequence.

The system 100 includes a user device 110, which is coupled to a search system 140 through networks 130. In general, the user device 110 communicates search data 120 over the networks 130 to the search system 140. The search system 140 processes the search data 120 and returns results data 160 to user device 110 over the networks 130. A representation of the results data 160 is displayed to a user using the user device 110. The system 100 may be used, for example, to perform an instant search in which search results are generated and presented on the display of the user device 110 as the user enters one or more characters corresponding to a query term, with the search results getting updated as the user enters additional characters for the query term.

The user device 110 may be, for example, a smart phone, a tablet computer, a notebook computer, a laptop computer, an e-book reader, a music player, a desktop computer or any other appropriate portable or stationary computing device. The user device 110 may include one or more processors configured to execute instructions stored by a computer readable medium for performing various client operations, such as input/output, communication, data processing, and the like. For example, the user device 110 may include or communicate with a display 112 and may present information associated with a search to a user. The display device 112 may be implemented as a proximity-sensitive display (e.g. a touch screen) such that the user may enter information by touching or hovering a control object (for example, a finger or stylus) over the display 112.

In order to perform a search, the user may launch a search application that provides an interface to the user via the display 112. The information that is entered by the user and processed by the system 100 is presented on the display 112 by the search application interface, and may include search term 116 and search results 118 corresponding to the search term 116. The user may enter additional information for the search term, e.g., by drawing a pattern on the display 112. The user device 110 may present on the display 112 a representation 119 of the pattern drawn by the user, e.g., digital ink. The interface may be presented on the display 112 using a web browser that is invoked on the user device 110, or the interface may be a dedicated interface for the search application, e.g., a native search application.

The pattern drawn by the user may correspond to a letter of an alphabet or to a character of a non-alphabetical language. In some applications, the user may draw one or more characters of a language in a cursive script. In yet other applications, the pattern may correspond to glyphs that are not necessarily characters of any language, but could be interpreted and used to trigger a useful search, e.g., a smiley face, a heart, or a star.

The search data 120 that is sent from the user device 110 over networks 130 to the search system 140 may include characters 122 that the search system 140 has previously recognized, as well as gesture data 124 corresponding to the pattern that has been drawn by the user since a last search was performed. In some implementations, the search data 120 may include gesture data corresponding to one or more patterns that were previously drawn by the user, before drawing the pattern shown by the representation 119. In an alternative implementation, the search data 120 may include only the gesture data 124 corresponding to the newly drawn pattern. In yet other implementations, the search data may include gesture data corresponding to multiple newly drawn patterns. This may be the case, for example, when the search system 140 is configured to support recognition of multiple characters at a time.

The networks 130 may include a circuit-switched data network, a packet-switched data network, or any other network able to carry data, for example, Internet Protocol (IP)-based or asynchronous transfer mode (ATM)-based networks, including wired or wireless networks. The networks 130 may be configured to handle web traffic such as hypertext transfer protocol (HTTP) traffic and hypertext markup language (HTML) traffic. The networks 130 may include the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

The search system 140 may be implemented as computer programs installed on one or more network devices in one or more locations that are coupled to each other through a network, e.g., the networks 130. The search system 140 may include one or more servers, e.g., a cloud computing server, a server farm, or another server arrangement including one or more processors configured to execute instructions stored by a computer-readable medium for performing various server operations. In one example implementation, the search system 140 may be a server farm that is administered by a search engine provider. The search system 140 includes a front end 145 that is connected to a gesture engine 150 and a search engine 155. The front end 145 may be a gateway server that is configured to process all communication with entities outside the server farm. The front end 145 also may be configured to coordinate the operation of the gesture engine 150 and the search engine 155 to determine a search term based on the received gesture data and return search results based on the determined search term.

The gesture engine 150 may be implemented on a server hosting one or more software processes that are configured to process the gesture data 147 and identify a character 152 that matches the gesture data. The identification of the character 152 may occur by finding a closest match to between the gesture data 147 and one or more characters that are included in a database of characters available to the gesture engine 150. A closest match may be determined, for instance, using a statistical distance measurement, for example by identifying a character that has the least statistical distance from the gesture data 147. The gesture data 147 may be similar to the gesture data 124 that is transmitted with the search data 120. The identified character 152 along with the previously recognized characters 122 may form the search term 154. In some implementations, the gesture engine 150 may be configured to identify multiple characters 152 at once, matching the gesture data corresponding to a single pattern or multiple patterns drawn by the user.

The search engine 155 may be implemented on a server hosting one or more software processes that are configured to process the search term 154 and identify one or more web pages as search results 157 that match the search term 154, or include the search term 154. The search engine will generally include an indexing engine that indexes resources, e.g., web pages, images, or news articles on the Internet, and a ranking engine to rank the resources that have been identified. The indexing and ranking of the resources may be performed using conventional techniques. In the present example, the search engine 155 may be a web server that is configured to return search results 157 corresponding to the search term. The search results 157 may include links to webpages that include the search term or match the search term based on some appropriate metric. Alternatively, the search results 157 may include links to images or video files or audio files, or any combination thereof, which are associated with the search term based on some appropriate metric.

The results data 160 that is returned by the search system 140 to the user device 110 may include units of information that are suitably formatted for transmission over the networks 130 and for displaying to the user on the user device 110, e.g., as displayed in a web browser on the user device 110. For example, the search results 157 may be included in a markup language document, e.g., HyperText Markup Language (HTML) or eXtensible Markup Language (XML) document, which is sent over the networks 130 as payload included in Internet Protocol (IP) packets. The results data 160 may include recognized characters 162 and search results 164 generated using the recognized characters 162 as the search term. In an alternative implementation, the results data 160 may include only the search results 164. The recognized characters 162 may include the previously recognized characters 122 that were sent with the search data 120 and the newly recognized character 152 corresponding to the gesture data 124. The search results 164 may be identical to the search results 157. Alternatively, the search results 164 may include information similar to the search results 157, but may be formatted differently for transmission over the networks 130 to the user device 110.

The user device 110 renders the results data 160, for example, using the interface provided by the search application (e.g., via a web browser), and presents the search results 164 using the display 112. The recognized characters 162 are displayed as search term 172 in a query box or "search box", while the search results 164 are displayed in the results field 174 below the displayed search term 172.

Referring to the example data flow, before state (A), the search application running on the user device 110 has received a recognized character, e.g. "B", from the search system 140 via the networks 130. The recognized character is displayed as search term 116 on the display 112. The user device 110 has also received, from the search system 140 via the networks 130, search results corresponding to the recognized character, which are displayed as search results page 118. The search term 116 and associated the search results page 118 correspond to a pattern that the user had drawn on the display 112 as part of a search for a "banana pie recipe."

During state (a), in order to enter more of the search term, the user gestures by drawing a new pattern on the display 112, while the search application interface is presented on the display 112. The user draws the pattern on the display 112 by touching the display 112, for example with a control object such as a finger, a stylus, a portion of a user's hand or arm, or another appropriate input mechanism, and tracing a character by moving the input mechanism in contact with the display. Although FIG. 1 describes the user tracing characters on the display using a finger, other appropriate input mechanisms may be used. In addition, the terms "drawing a gesture," "drawing a trace," "drawing a pattern," "tracing a gesture" and "tracing a character" are used interchangeably, with each referring to a similar action of the user entering information on the user device.

As the user draws the pattern on the display 112, a representation 119 of the pattern is rendered on the display 112, while data associated with the pattern, e.g., coordinates of the pixels of the display 112 corresponding to the zones of the display 112 touched by the user, is captured by the user device 110 as gesture data.

The search application determines that the user has finished gesturing. For example, the search application may determine that the user has finished gesturing when a contact of the user's finger is removed from the display 112 and there is no contact with the display 112 for a predefined period of time. The predefined period of time may be very short, e.g., one second, or it may be a few seconds.

In some implementations, the user device 110 may not have the processing capability to recognize a character corresponding to the user's pattern on the display 112. During state (B), the search application sends the gesture data 124, which corresponds to the user's pattern on the display 112, for processing to the search system 140 via the networks 130. In some implementations, the gesture data 124 may be in the form of a pixel map, while in alternative implementations, the gesture data 124 may be transmitted in some other form that is different from a pixel map. For example, the search application may send [x, y] coordinates of sampled points of the display corresponding to the gesture.

In some implementations, a pixel map is an array that represents the coordinates of the pixels of the display 112 that were touched by the user. Each element in the array may include the coordinates of a single pixel of the display 112. The elements in the array may be arranged in a sequence based on the order in which the pattern is drawn on the display 112 by the user, such that a reconstruction of the user's trace may be facilitated by analyzing the elements of the array in the sequence in which they are presented. An example of a pixel map is presented in FIG. 5.

In addition to the gesture data 124, the search application also sends to the search system 140 the previously recognized characters 122 (in the figure, "B"). The search application sends the previously recognized characters 122 along with the gesture data 124 in order to aid the identification of search results by the search system 140, or to aid the recognition of characters that correspond to the gesture data 124.

In some implementations, the gesture data 124 sent by the search application may include gesture data corresponding to the previously recognized characters 122. This may aid the search system 140 to correct errors with previously recognized characters, e.g., for poorly recognized initial characters, later characters may be used to correct what the initial characters are.

The previously recognized characters 122 and the gesture data 124 together form the search data 120 that is sent over the networks 130 to the search system 140. The search data 120 also may include instructions that aid the search system 140 to identify or parse the previously recognized characters 122 and the gesture data 124. The instructions also may aid the search system 140 to recognize new characters by processing the gesture data 120. In addition, the instructions may aid the search system 140 to process the recognized characters as the search term for finding search results. The search data 120 may be sent in an appropriate format for transmission over the networks 130, for example, as data included in one or more IP packets.

The search data 120 is received at the search system 140 by the front end 145. The front end 145 processes the search data 120 and extracts the previously recognized characters 122 (e.g., "B") and the gesture data 147. The gesture data 147 may be identical to the gesture data 124 that was transmitted as part of the search data 120. Alternatively, the gesture data 147 may include information similar to the gesture data 124, but excluding some formatting that might have been added by the search application for transmission over the networks 130.

Based on examining the extracted information, including instructions that may be included with the search data 120, the front end 145 determines that the gesture data 147 is to be processed by the gesture engine 150. Accordingly, during state (C), the front end sends the gesture data 147 to the gesture engine 150.

The gesture engine 150 processes the gesture data 147 and recognizes one or more characters that match the gesture data 147. The gesture engine 150 may select a particular character (in the figure, "a") to communicate back to the front end 145, for example by selecting a character that has a highest gesture recognition confidence value.

During state (D), the gesture engine 150 returns the newly recognized character 152 (e.g., "a") to the front end 145. In some implementations, in order to save on computing resources, the gesture engine 150 may not store the gesture data 147 or the newly recognized character 152 in local memory. Rather, the gesture data 147 or the newly recognized character 152 may be discarded once the newly recognized character 152 is transmitted to the front end 145.

In some implementations, the front end 145 may send both the previously recognized characters 122 (e.g. "B") and the gesture data 147 to the gesture engine 150. In such implementations, the previously recognized characters 122 may provide contextual information to the gesture engine 150 to facilitate recognition of characters corresponding to the gesture data 147. For example, the gesture engine 150 may use the previously recognized character "B" to eliminate character combinations that do not frequently occur in a particular language, e.g., the combination "Bx" in the English language. Conversely, the gesture engine 150 may use the previously recognized characters 122 to limit the character search space to characters that form a meaningful combination when paired with the previously recognized characters 122.

The front end 145 receives, from the gesture engine 150, the newly recognized character 152. The front end may determine, for example based on instructions that may have been included with the search data 120, that the previously recognized characters 122 and the newly recognized character 152 are to be used for performing a search. Therefore, the front end 145 may combine the previously recognized characters 122 and the newly recognized character 152 together to form the updated search term 154 (e.g., "Ba"). During state (E), the front end 145 transmits the search term 154 to the search engine 155.

The search engine 155 performs a search using the search term 154 and, during state (F), returns to the front end 145, links corresponding to web pages that match the search term 154, as search results 157. The search results 157 may be sent in the form of a search results page, or a portion of a search results page, that references the search results. In some implementations, in order to save on computing resources, the search engine 155 may not store in local memory the search term 154 or the search results 157. Rather, the search term 154 or the search results 157 may be discarded once the search results 157 are transmitted to the front end 145. Therefore, the front end 154 may facilitate the search engine 155 to return accurate search results corresponding to the search term 154 by providing to the search engine 150, for each instance of search, an updated search term 154 that includes both the previously recognized characters 122 and the newly recognized character 152.

Upon receiving the search results 157 from the search engine 155, the front end 145 populates the character field 162 with the previously recognized characters 122 and the newly recognized character 152. The front end 145 also includes the search results 157 in the search results field 164. During state (G), the front end 145 sends the results data 160 to the user device 110 over the networks 130.

In some implementations, the front end 145 may not store in local memory the recognized characters, the gesture data or the search results. Rather, the recognized characters, the gesture data or the search results may be discarded once the recognized characters and the search results are transmitted to the user device. Therefore, in order to facilitate the front end 145 to provide to the search engine 155 with the correct search term for every instance of search, the search application on the user device 110 may include the previously recognized characters 122 in the search data 120 when sending the search data 120 to the search system 140.

During state (H), the user device 110 receives the results data 160, and communicates the results data 160 to the search application running on the user device 110. The search application processes the results data 160 to extract the recognized characters from the character field 162 and the search results 164. The search application presents, on the display 112, the recognized characters as search term 172 in the search box of the search application interface.

The search application also presents the search results 164 in the results field 174, for example below the displayed search term 172. As shown in state (H), the search term 172 is "Ba", and the results field 174 includes search results with the phrases "Bank of Example," "Banana Pie Recipe" and "Bank of Alaska," each matching the search term "Ba." Because the search results include a link to a web page corresponding to the user's information need (e.g., "Banana Pie Recipe"), the user may opt to visit the corresponding web page, for example, by tapping the section of the display 112 immediately above the link corresponding to "Banana Pie Recipe," which subsequently may present on the display 112 the web page associated with the selected link.

On the other hand, the user may want to continue with the search and therefore input more characters corresponding to the search term, for example by tracing characters on the display 112 in a manner as described above, or by some other appropriate method. For each character thus entered, the process as described above may be repeated, including: sending previously recognized characters and the gesture data over the networks 130 to the search system 140, recognizing a character corresponding to the gesture data by the gesture engine 150, determining search results corresponding to the search term by the search engine 155, and returning over the networks 130 the recognized characters and the search results to the user device 110 to be presented to the user. Therefore, the search term 172 presented in the query box or search box and the corresponding search results in the results field 174 are updated as the user enters more characters, thus providing an enhanced search experience. This may be the case, for example, when the search being performed is an instant search.

In summary, the search application on the user device 110 transmits to the search system 140 the previously recognized characters 122 along with the gesture data 124, in order to facilitate determination of search results by the search engine 155. The front end 145 sends to the user device 110 the recognized characters 162 along with the most recent search results 164, so that the recognized characters are presented as to the user as the search term 172 with the search results in the results field 174. Therefore, the system 100 provides to the user an interpretation of the patterns drawn by the user, and may also provide a context for the search results that are displayed.

Figure 2:
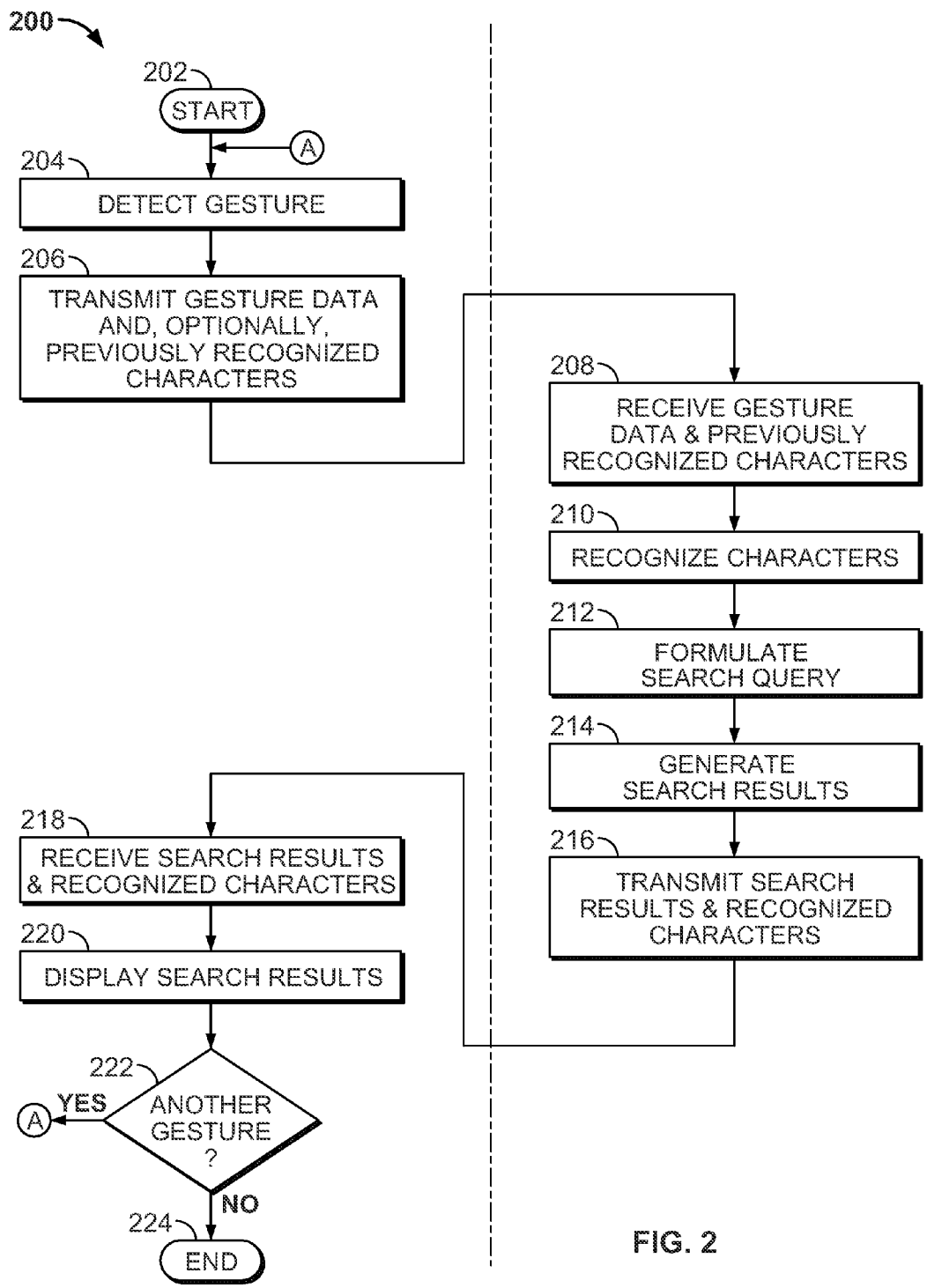
FIG. 2 is a flow chart illustrating an example of a process for performing a search based on a pattern that is drawn on a display of a user device.

FIG. 2 is a flow chart illustrating an example of a process 200 for performing a search based on a pattern that is drawn on a display of a user device. For example, the process 200 may be used to perform an instant search in which search results are presented on the display of the user device as the user enters one or more characters corresponding to a query term, with the search results being updated as the user enters additional characters for the query term. The process 200 may be implemented by one or more computer programs installed on one or more computers. The following describes the process 200 as being performed by components of the system 100. However, the process 200 may be performed by other systems or system configurations.

The process 200 starts (202) when the system receives information to perform a search. For example, a user may initiate a search by launching a search application on the user device 110 and tracing a character on the display 112.

The system detects the user's gesture (206). For example, the display 112 may be a touch-sensitive display and the user device 110 may be configured to detect the touch of the user's finger while the user is drawing a pattern on the display 112. As the user draws the pattern on the display 112, the user device 110 may capture the data associated with the pattern, e.g., coordinates or screen zones of the pixels of the display 112 corresponding to the sections of the display 112 touched by the user, as gesture data. The user device 110 may store the captured gesture data. In some implementations, the gesture data may be stored in the form of a pixel map. However, in some alternative implementations, the gesture data may be stored in some other form that is different from a pixel map.

The system transmits the gesture data for processing (206). In some implementations, in addition to the gesture data, the system also transmits the previously recognized characters, while in some other implementations only the gesture data is transmitted. This may be the case, for example, in some implementations where the search system caches in local memory previously recognized characters for a given search session. However, in some other implementations, the search system may not store the previously recognized characters in local memory and therefore the search application on the user device sends the previously recognized characters along with the gesture data in order to aid the search system to identify search results, as described previously.

In addition, the previously recognized characters may aid the search system to recognize characters corresponding to the gesture data, as described previously. For example, the search application on the user device 110 may transmit a gesture data to a search system via a network. In addition, the search application may also send to the search system previously recognized characters.

The system receives the gesture data and any previously recognized characters (208) that are transmitted. For example, the search system may receive, at a front end, the search data that is transmitted by the search application on user device. The search data may include the previously recognized characters and the gesture data. In some implementations, the search system may receive only the gesture data.

The system recognizes characters based on the received data (210). For example, the front end of the search system processes the search data and extracts the previously recognized characters and the gesture data that is similar to the gesture data 124. The front end sends the gesture data to the gesture engine 150, which processes the gesture data and determines a recognizable character that matches the gesture data. Subsequently, the gesture engine 150 returns the newly recognized character 152 to the front end 145.

The system formulates a search based on the recognized characters (212). For example, upon receiving the newly recognized character 152 from the gesture engine 150, the front end 145 may determine that the previously recognized characters 122 and the newly recognized character 152 are to be used for performing a search. Therefore, the front end 145 may form a new search term 154 by combining the previously recognized characters 122 and the newly recognized character 152 and transmit the search term 154 to the search engine 155.

The system generates search results (214). For example, upon receiving the search term 154 from the front end 145, the search engine 155 may perform a search using the search term 154. The results of the search operation may be returned to the front end 145 as search results 157. The search engine 155 may send the search results 157 in the form of a web page that includes links to web pages that match the search term 154.

The system collects the search results and the recognized characters corresponding to the received gesture data. Subsequently the system transmits the search results and the recognized characters (216). In some implementations, the system transmits both the previously recognized characters and the newly recognized characters, while in some other implementations, the system transmits only the newly recognized characters. For example, the front end 145 of the search system 140 generates results data 160 that includes a character field 162 and a search results field 164. The front end 145 places the previously recognized characters 122 and the newly recognized character 152 into the character field 162, and includes the search results 157 in the search results field 164. The front end 145 then sends the results data 160 to the user device 110 over the networks 130.

The system receives the search results and the recognized characters (218). For example, the user device 110 receives the results data 160 from the search system 140 and forwards it to the search application running on the user device 110.

Upon receiving the search results and the recognized characters, the system displays the search results (220). For example, the search application running on the user device 110 processes the results data 160 to extract the recognized characters 162 and the search results 164. The search application presents, on the display 112, the recognized characters 162 as updated search term 172 in the search box of the search application interface. The search application also presents the search results 164 in the results field 174 of the search application interface, usually below the displayed search term 172.

After displaying the search results, the system checks whether another gesture is detected (222). If the system determines that another gesture is detected, then the system repeats the process 200, from detecting the gesture (204) through displaying the search results (220) based on the updated search corresponding to the newly detected gesture. However, if no gesture is detected, then the system terminates the process 200 (224).

The user may input more characters for the search term by tracing characters on the display 112, or by some other appropriate method. For each character thus entered, the search application running on the user device 110 may send previously recognized characters and the gesture data over the networks 130 to the search system 140; the system 140 may recognize characters corresponding to the gesture data using the gesture engine 150, formulate a search term based on the previously recognized characters and the newly recognized character using the front end 145, determine search results corresponding to the search term using the search engine 155, and return over the networks 130 the recognized characters and the search results to the user device 110 to be presented to the user.

Figure 3:
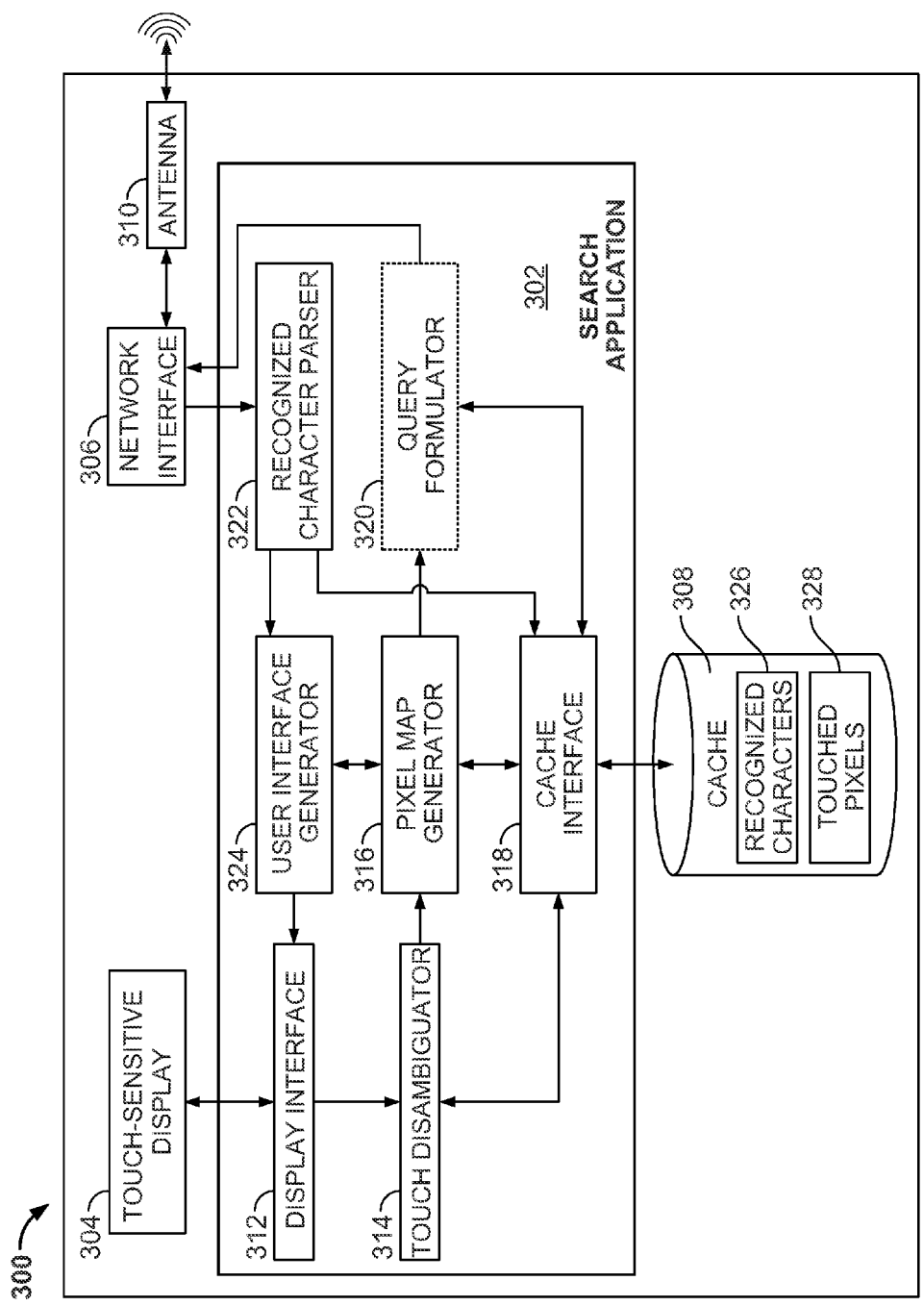
FIG. 3 illustrates an example of a system used for detecting a pattern drawn on a display of a user device and presenting search results based on the detected pattern.

FIG. 3 illustrates an example of a system 300 used for detecting a gesture drawn on a display of a user device and presenting search results based on the detected gesture. The system 300 may be implemented, for example, by the user device 110 in the system 100. The system 300 may be used, for example, for performing an instant search in which search results are presented on the display of the user device 110 as the user enters one or more characters corresponding to a query term, with the search results being updated as the user enters additional characters for the query term.

The system 300 includes a search application 302 that is coupled to a touch-sensitive display 304, a network interface 306 and a cache 308. The network interface 306 is also coupled to an antenna 310. The search application 302 has several components including a display interface 312 that couples the search application to the touch-sensitive display 304, a touch disambiguator 314, a pixel map generator 316, a cache interface 318 that couples the search application 302 to the cache 308, a query formulator 320, a recognized character parser 322 that couples the search application 302 to the network interface 306, and a user interface generator 324. The cache 308 includes recognized characters 326 and touched pixels 328.

In some implementations, the search application 302 may be a software application, e.g., executable software code, which is resident in local memory on a computing device, e.g., the user device 110. In some other implementations, the search application 302 may be a hardware application, e.g., a microchip or field programmable gate logic (FPGA) with search functionality programmed within, which is coupled with other hardware in a computing device, e.g., the user device 110.

The search application 302 may be configured to facilitate character recognition corresponding to patterns drawn on a display of the computing device by a user, and returning search results using a search term that is based on the recognized characters. The search application 302 may be launched on the computing device by the user, for example, by tapping on an icon displayed on a home screen of the computing device. Alternatively, the search application 302 may be more or less continuously running on the computing device.

The search application 302 may be configured to present to the user, a search term and associated search results through an interface that is displayed on the display of the computing device, for example, the display 112 of the user device 110. In some implementations, the search application interface may be provided by a web browser running on the user device. In some other implementations, the interface may be an interface other than a web browser that is dedicated for use by the search application 302.

The search application 302 may be configured to communicate with a search system, e.g., the search system 140. The search application 302 may forward to the search system, gesture data corresponding to patterns drawn on the display of the computing device. In response, the search application 302 may receive search results and recognized characters back from the remote search system. The search application 302 may present, on the display of the computing device via the interface, a search term corresponding to the recognized characters and associated search results.

The system 300 is provided with a touch-sensitive display 304 (e.g. a touch screen) that is configured to accept information entered by the user by touching the display 304. The touch-sensitive display 304 is also configured to display to the user various information, e.g., the search term and associated search results corresponding to patterns drawn on the surface of the display 304 by the user. The touch-sensitive display 304 may be, for example, the display 112 of user device 110. In some implementations, the touch-sensitive display 304 also may be a proximity-sensitive display, i.e., the display 304 may be configured to detect the physical proximity of the user and accordingly adjust one or more configuration parameters of the display to facilitate comfortable viewing by the user.

The system 300 is provided with a network interface 306 that is configured to enable the system 300 to communicate with remote systems and devices via one or more networks, e.g., the networks 130. The network interface may be a piece of hardware, e.g., an Ethernet port or IEEE 802.11 chip, or a piece of software, e.g., a software radio, or any appropriate combination of hardware and software. Information that is transmitted or received by the search application 302 through communication with a search system is processed by the network interface 306 as a point of entry and/or exit for the system 300.

The system 300 is provided with the antenna 310, which may be a piece of hardware that is configured to transmit and receive information exchanged with remote systems and devices as electromagnetic waves, e.g., radiofrequency (RF) waves or infrared (IR) waves. The antenna 310 receives, from the network interface 306 that is coupled to the antenna 306, data to be transmitted, and broadcasts the data as electromagnetic waves. The antenna 310 also receives data from remote systems and devices as electromagnetic waves and forwards the received data to the network interface 306 for processing. The system 300 may be provided with one antenna 310 or with multiple antennas 310.

The system 300 is provided with a cache 308, which may be implemented in local memory for storing information. For example, the cache 308 may be implemented in a random access memory (RAM) provided in the user device 110. The cache 308 may be configured for quick storage and retrieval of data used by the search application 302. The search application 302 may store recognized characters 326 in the cache 308. The recognized characters 326 may include characters that are recognized based on patterns drawn on the surface of the touch-sensitive display 304. For example, the recognized characters 326 may include the previously recognized characters corresponding to the search term 116, or a combination of previously recognized and newly recognized characters corresponding to search term 172.

The search application 302 also may store touched pixels 328 in the cache 308. The touched pixels 308 include information on the coordinates or screen zones of the pixels of the touch-sensitive display 304 corresponding to the sections of the display 304 touched by the user. For example, the touched pixels 308 may include coordinates of the pixels of the display 112 corresponding to the sections of the display 112 touched by the user as the user draws a pattern on the display 112. The touched pixels 328 may also include, for example, the gesture data (e.g., pixel map) associated with the pattern drawn by the user that is transmitted by the user device 110 to the remote system 140. In addition, the touched pixels 328 may include gesture data associated with previously entered gestures, corresponding to which characters may have already been recognized and stored in the recognized characters 326. The system 300 may use information associated with the touched pixels 328 to provide a visible trace representation on the touch-sensitive display 304 as the user draws a pattern on the surface of the display, e.g., the trace 119 that is presented on the display 112. The system 300 also may use the information associated with the touched pixels 328 to generate gesture data (e.g., a pixel map) corresponding to a pattern drawn by the user on the touch-sensitive display 304.

The system 300 is provided with a display interface 312 that couples the search application 302 with the touch-sensitive display 304. In some implementations, the display interface 312 may be provided as a module of the search application 302, while in some other implementations the display interface 312 may be provided as a generic application on the computing device running the search application 302 (e.g., user device 110) that is shared among different applications, including the search application 302. The display interface 312 may be a graphical user interface (GUI), or it may be a text-based interface or any appropriate combination thereof. In some implementations, the display interface 312 may be provided by a web browser that is included with the system 300. In some other implementations, the display interface 312 may be an interface other than a web browser that is dedicated for use by the search application 302. The display interface 312 may be configured to present, on the touch-sensitive display 304, a search term and associated search results based on patterns drawn by the user on the touch-sensitive display 304.

The system 300 includes a touch disambiguator 314. In some implementations, the touch disambiguator 314 may be provided as a module of the search application 302, while in some other implementations the touch disambiguator 314 may be provided as a generic application on the computing device running the search application 302 (e.g., user device 110) that is shared among different applications, including the search application 302. The touch disambiguator 314 is configured to differentiate between various touch actions that are performed on the surface of the touch-sensitive display 304 by the user. For example, the touch disambiguator 314 may be configured to differentiate an action that involves the user momentarily removing his finger from contact with the touch-sensitive display 304 to dot an "i", from a different action that involves the user removing his finger from contact with the touch-sensitive display 304 to indicate end of a pattern.

The touch disambiguator 314 also may be responsible for translating commands provided by the system 300. Such commands may come from the touch-sensitive display 304 (e.g., the display 112 associated with the user device 110), or from other such sources, including dedicated buttons or soft buttons (e.g., buttons whose functions may change over time, and whose functions may be displayed on areas or zones of the touch-sensitive display 304 that are adjacent to the particular buttons) that are coupled to the system 300. The touch disambiguator 314 may interpret input motions on the touch-sensitive display 304 into a common format and pass those interpreted motions (e.g., short press, long press, flicks, and straight-line drags) to the search application 302. In addition, the touch disambiguator 314 may determine, for example, in what area or zone of the display 304 commands are being received, and thus an application being shown on the display for which the commands are intended. The touch disambiguator 314 may also report such inputs to an event manager (not shown) that in turn reports them to the appropriate modules or applications.

The system 300 includes a pixel map generator 316. In some implementations, the pixel map generator 316 may be provided as a module of the search application 302, while in some other implementations the pixel map generator 316 may be provided as a generic application on the computing device running the search application 302 (e.g., user device 110) that is shared among different applications, including the search application 302. The pixel map generator 316 is configured to generate a pixel map based on a pattern that is drawn on the surface of the touch-sensitive display 304 by the user. For example, the pixel map generator may communicate with the cache 308 to retrieve the touched pixels 328 and create a pixel map using information associated with the touched pixels 328. The pixel map may be sent by the search application 302 to a search system as gesture data (e.g., gesture data 124) corresponding to the pattern that is drawn on the surface of the touch-sensitive display 304 by the user.

The system 300 includes a cache interface 318. In some implementations, the cache interface 318 may be provided as a module of the search application 302, while in some other implementations the cache interface 318 may be provided as a generic application on the computing device running the search application 302 (e.g., user device 110) that is shared among different applications, including the search application 302. The cache interface 318 is configured to enable the search application 302, including different components of the search application 302, to communicate with the cache 308. The cache interface 318 facilitates the storage of recognized characters 326 and touched pixels 328 in the cache 308 by various components of the system 300. The cache interface 318 also facilitates the retrieval of recognized characters 326 and touched pixels 328 in the cache 308 by various components of the system 300, for example, by the pixel map generator 316 and the query formulator 320.

In some implementations, the system 300 may include a query formulator 320 that is provided as a component of the search application 302. This may be the case, for example, when the system 300 has the processing capability to identify characters corresponding to patterns drawn by the user on the touch-sensitive display 304. In such implementations, the query formulator 320 may be configured to recognize a new character corresponding to patterns drawn by the user on the touch-sensitive display 304. The query formulator 320 may communicate with the cache 308 to store the newly recognized character. The query formulator 320 also may retrieve previously recognized characters 326 from the cache 308 and combine them with the newly recognized character to formulate a search term. The query formulator 320 is coupled to the network interface 306 and it may send the formulated search term to search systems (e.g. the search system 140) through the network interface 306.

In some other implementations, the system 300 may not have the processing capability to identify characters corresponding to patterns drawn by the user on the touch-sensitive display 304. In such implementations, the query formulator 320 may not be present.

The system 300 includes a recognized character parser 322 that is provided as a component of the search application 302. The recognized character parser 322 is coupled to the network interface 306 and it receives information from search systems through the network interface 306. For example, the recognized character parser 322 may receive the results data 160 from the search system 140. The recognized character parser 322 is configured to parse the received information (e.g., the results data 160) and extract the recognized characters (e.g., the recognized characters 162) and the search results (e.g., the search results 164). The recognized character parser 322 sends the extracted characters and the search results to the user interface generator 324. In addition, the recognized character parser 322 is coupled to the cache interface 318 and it sends the recognized characters to the cache 308 for storage as recognized characters 326.

The system 300 includes a user interface generator 324 that is provided as a component of the search application 302. The user interface generator 324 receives the recognized characters and search results from the recognized character parser 322 and formats them for presentation on the touch-sensitive display 304 using the display interface 312. For example, the user interface generator 324 may be included as part of the search application on the user device 110. In this case, the user interface generator 324 may format the recognized characters 162 to be presented as search term 172 in the query box or search box of the search application interface that is displayed on the display 112. The user interface generator 324 also may present the search results 164 as links to web pages in the results field 174 that is included in the displayed search application interface, usually below the displayed search term 172.

Figure 4:
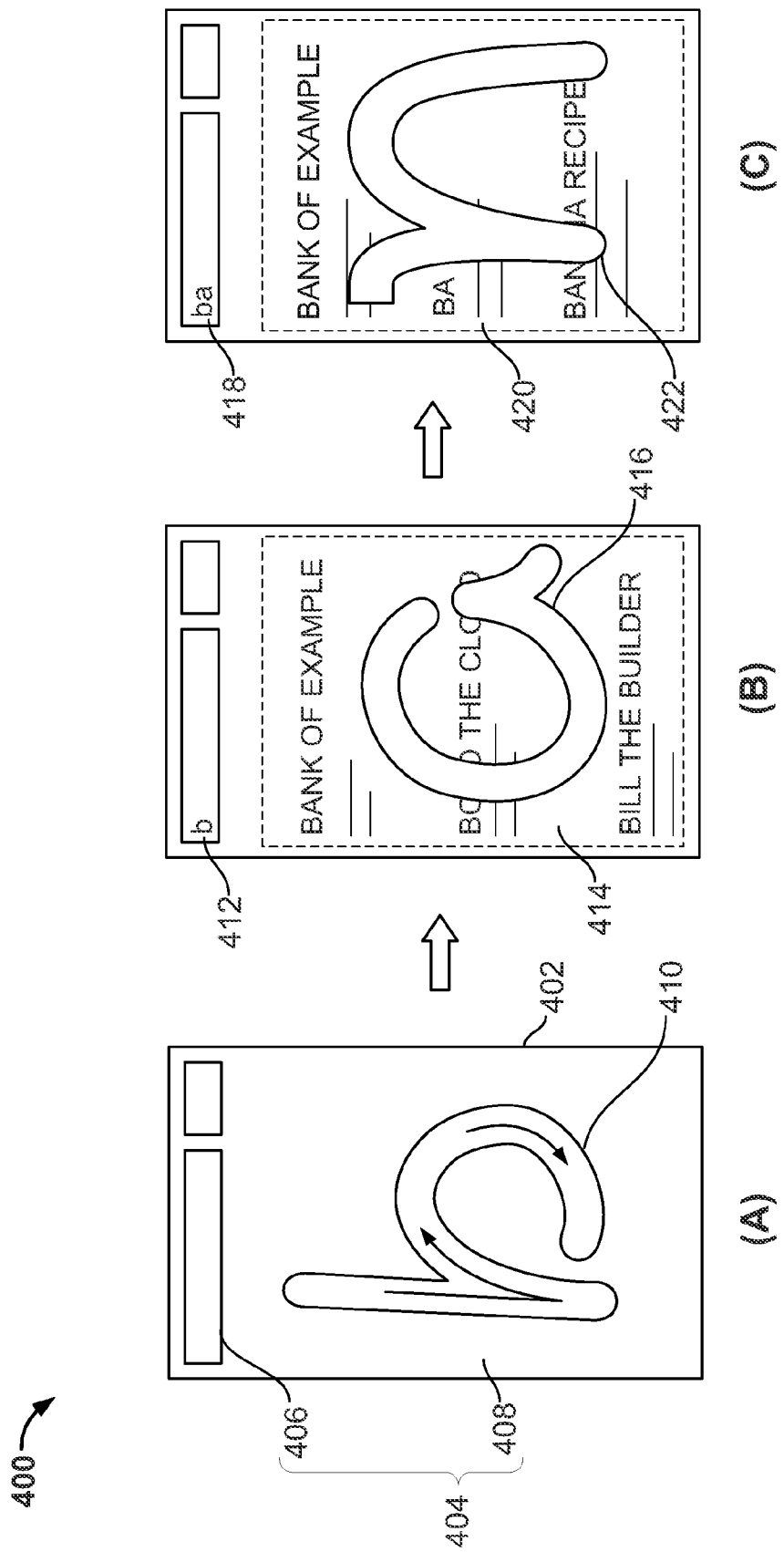
FIGS. 4A-4C illustrate a series of screenshots of an exemplary user device 400 presenting a search term and associated search results corresponding to user-drawn patterns on the display of the user device 400.

FIGS. 4A-4C illustrate a series of screenshots of an exemplary user device 400 presenting a search term and associated search results corresponding to user-drawn patterns on the display of the user device 400. The user device 400 may be, for example, the user device 110, or it may be some other appropriate device includes a touch-sensitive display.

FIG. 4A shows a display 402 of the user device 400 on which is presented a search application interface 404. The search application interface 404 includes a search box 406 and a search results field 408. A pattern drawn by a user on the surface of the display 402 is indicated by the trace 410.

The display 402 may be, for example, the touch-sensitive display 112 associated with the user device 110. FIG. 4A shows the display 402 at a time when no search results have been generated, for example, at the initiation of the search. This is indicated by the empty search box 406 and the empty search results field 408. The search application interface 404 may be presented on the display 402 when the user launches the search application on the user device 400, for example, by tapping on an icon displayed on a home screen of the user device 400. Alternatively, the search application may be continuously running on the user device 400 such that the interface 404 is always presented on the display 402.

The user may enter a search term by drawing a pattern on the display 402. The user device 400 may be configured to provide a trace of the pattern on the display 402. For example, the user may have drawn the pattern "b" on the display 402 and accordingly the trace 410 indicating the pattern "b" is displayed in the foreground of the display 402, with the search application interface 404 being visible in the background. One or more characters may be recognized based on the user-drawn pattern and search results returned using the one or more recognized characters as the query term, for example by the search system 140. FIG. 4B shows the display 402 at a time when a character has been recognized corresponding to the pattern described with reference to FIG. 4A. For example, the recognized character may be "b" that is used as the search term to generate search results that are returned to the user device 400. The recognized character is displayed on the search application interface 404 as the search term 412 in the search box 406. The search results 414 are displayed in the search results field 408 of the search application interface 404. For example, as shown by FIG. 4B, the search term 412 is "b", and the corresponding search results 414 include links to web pages that include the phrases "Bank of Example," "Bozo The Clown" and "Bill the Builder," with each phrase matching the search term "b".

While the search term 412 and associated search results 414 are displayed, the user may input additional characters corresponding to the search term, for example by drawing a new pattern on the display 402, or by some other appropriate method. The user device 400 may be configured to provide a representation of the new pattern on the display 402, superimposed on the search application interface 404. For example, as shown in FIG. 4B, the user may draw the pattern "a" on the display 402 and accordingly the representation 416 indicating the pattern "a" is displayed in the foreground of the display 402, with the search interface 404 being visible in the background. The representation 416 may obscure some sections of the search results 414, for example, the link with the phrase "Bozo The Clown."

One or more new characters may be recognized based on the new user-drawn pattern and the search term is updated to include both the previously recognized characters and the newly recognized characters. Therefore, new search results are generated based on the updated search term and returned to the user device 400.

FIG. 4C shows the display 402 at a time when a new character has been recognized corresponding to the pattern described with reference to FIG. 4B, and the search term has been updated to include the new character, and new search results based on the updated search term are returned to the user device 400. The previously recognized characters and the newly recognized characters are displayed together on the search application interface 404 as the search term in the search box 406. The new search results are displayed in the search results field 408 of the search application interface 404. For example, as shown in FIG. 4C, the updated search term 418 is "ba", and the corresponding search results 420 include links to web pages including the phrases "Bank of Example," "Baby" and "Banana Recipe," with each phrase matching the search term "ba". The links to web pages including the phrases "Bozo The Clown" and "Bill The Builder", which were included in the search results 414, are not included in the search results 420 as they do not match the updated search term "ba".

If the search results 420 include a search result that matches the user's desired search the user may opt to visit the corresponding web page, for example, by tapping the section of the display 402 immediately above the link corresponding to the matching result, which subsequently may present on the display 402 the web page associated with the selected link. On the other hand, the user may continue to input more characters corresponding to the search term, for example by tracing characters on the surface of display 402 in a manner as described above, or by some other appropriate method. For example, as shown in FIG. 4C, the user may draw a new pattern "n" on the display 402 and accordingly the trace 422 indicating the pattern "n" may be shown in the foreground of the display 402, with the search term 418 and the search results 420 being visible in the background. The system may subsequently recognize the new character as "n", update the search term to "ban" and generate search results that match the updated search term.

Figure 5:
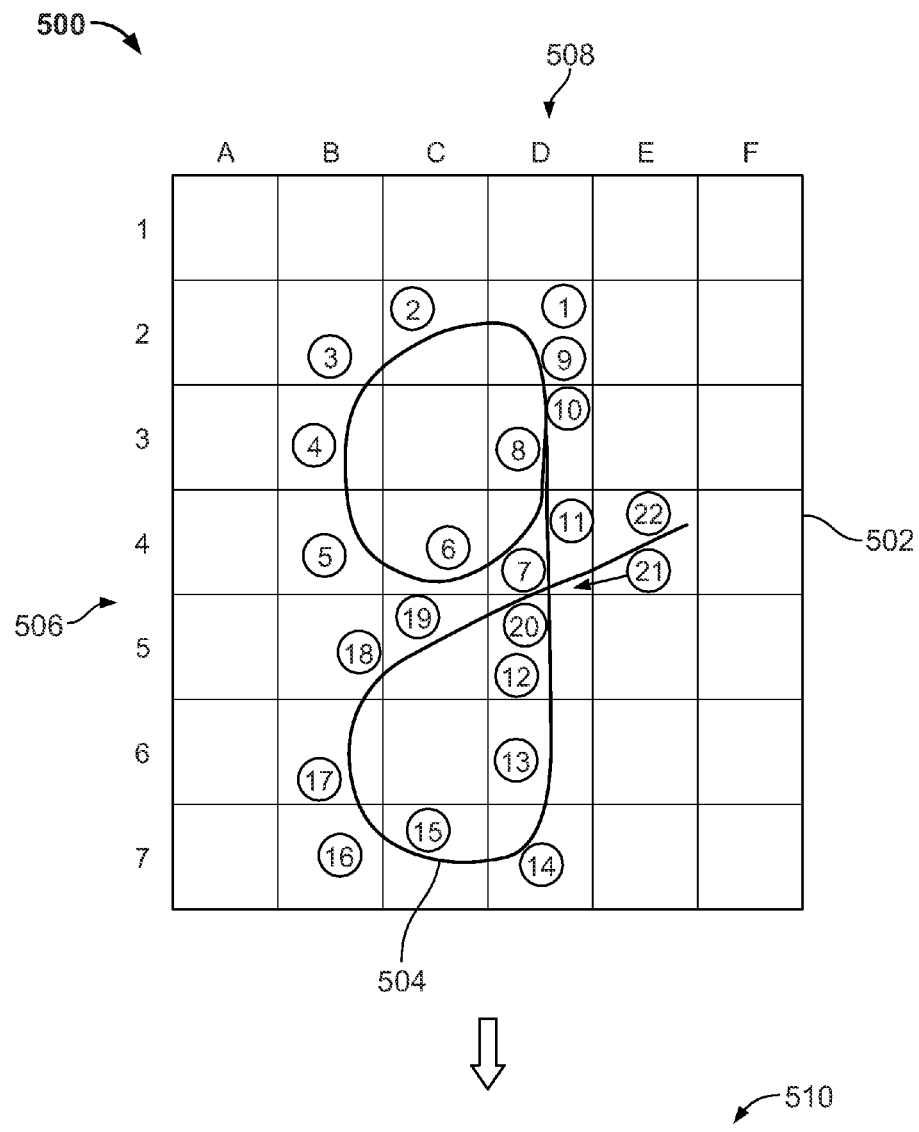
FIG. 5 illustrates an exemplary system that may be used to generate a pixel map based on a pattern that is drawn on a display of a user device.
Figure 6:
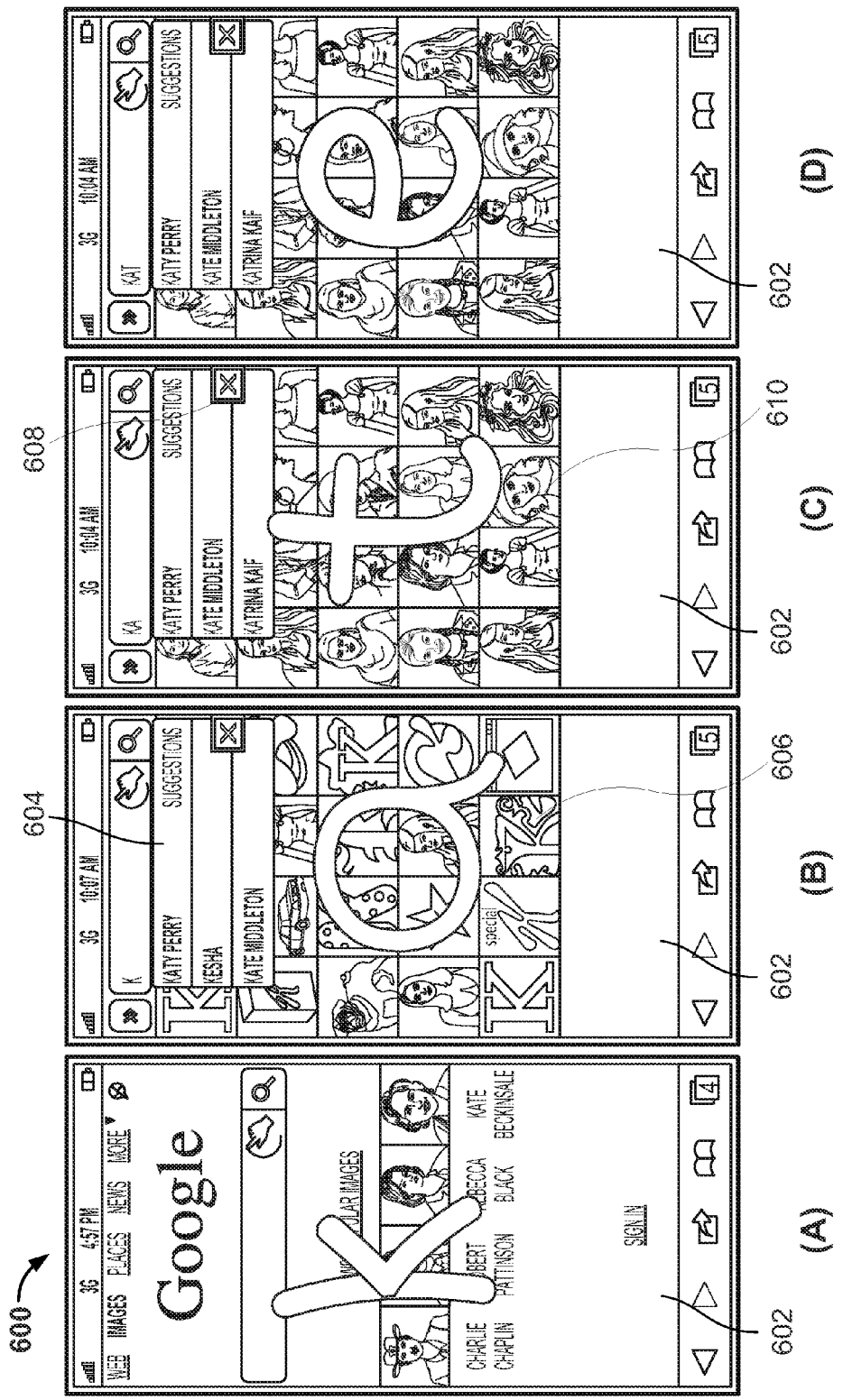
FIGS. 6A-6F illustrate an example of a system that may be used to perform a search in which images are returned as search results based on patterns drawn on a display of a user device.
Figure 6:
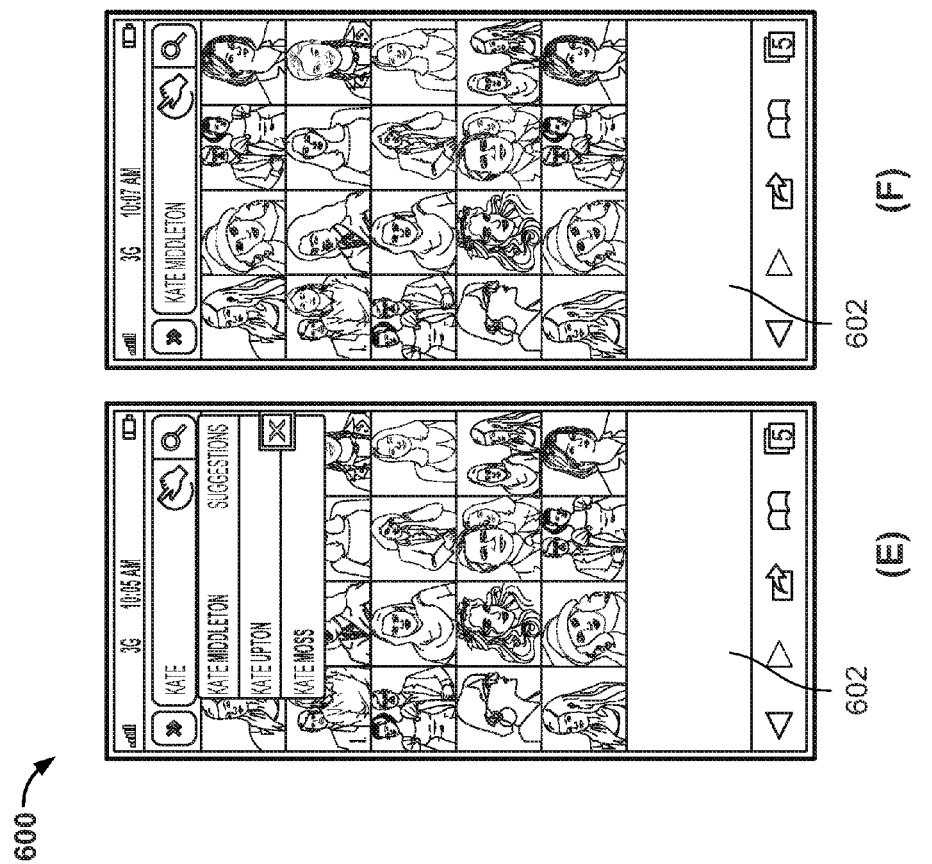

FIG. 5 illustrates an exemplary system 500 that may be used to generate a pixel map based on a pattern that is drawn on a display of a user device. The system 500 may be implemented by one or more computer programs installed on one or more computers. The following describes the system 500 as being implemented by search application 302. However, the system 500 may be implemented by other applications, systems or system configurations.

The system 500 includes a display 502, which is included in or coupled to a user device, on which a pattern represented by 504 may be drawn by a user. The display 502 may be mapped to an array of pixels with rows 506 and columns 508. The system 500 may generate a pixel map 510 corresponding to the pattern represented by 504.

The display 502 may be a touch-sensitive display (e.g. a touch screen) that is configured to accept information entered by the user by touching the display 502. The touch-sensitive display 502 may be, for example, the display 304 included in the system 300. The touch-sensitive display 502 may be configured to display to the user a trace of the information that is entered by the user by touching the display 502, e.g. a trace of a pattern that is drawn by the user on the surface of the display 502. For example, the user may draw the pattern "g" on the surface of the display 502 with a finger or some other appropriate input method. The system 500 will process the user's pattern and present on the display 502 a trace 504 of the pattern "g".

The system 500 stores pixels corresponding to zones or points of the display 502 that are touched by the user. This may be performed, for example, by the touch disambiguator 314 or the pixel map generator 316 or any appropriate combination thereof. The system 500 maps the display 502 to an array of pixels based on rows 506 and columns 508. Each pixel in the array is identified by its corresponding row and column, e.g., the elements A1 and B2 of the array as shown in FIG. 5, represent two distinct pixels. The array of pixels is generated such that each zone of the display 502 is represented by an element of the array.

When the user draws a pattern on the display 502, the system 500 detects each zone of the display 502 touched by the user and identifies the pixel representing the detected zone. For example, as the user draws the pattern represented by the trace 504 on the display 502, the user may touch zones of the display in a sequence indicated by the numbers (1) to (22) in FIG. 5. The system 500 will detect the touched zones in order and identify the pixels corresponding to the touched zones. The system 500 will store the identified pixels as elements of the array, e.g., the system 500 will store the coordinates D2, C2, B2, B3, B4, C4, D4, D3, D2, D3, D4, D5, D6, D7, C7, B7, B6, B5, C5, D5, D4, E4, corresponding to the pixels associated with the touched zones (1) to (22), respectively. The above operation may be performed by the touch disambiguator 314, which stores the pixel coordinates D2, C2, B2, B3, B4, C4, D4, D3, D2, D3, D4, D5, D6, D7, C7, B7, B6, B5, C5, D5, D4, E4, in the cache 308 as touched pixels 328.

When the system 500 determines that the user has completed tracing the character on the display 502, e.g., based on determining that the user has not touched the display 502 for a predefined period of time, the system 500 retrieves the stored pixels and generates a pixel map. For example, the pixel map generator 316 retrieves the touched pixels 328 from the cache 308 and generates the pixel map 510 corresponding to the trace 504 as {D2, C2, B2, B3, B4, C4, D4, D3, D2, D3, D4, D5, D6, D7, C7, B7, B6, B5, C5, D5, D4, E4}. Subsequently the system 500 may send the pixel map 510 to a search system (e.g., search system 140) for recognizing characters corresponding to the pixel map and generating search results based on the recognized characters.

FIGS. 6A-6F illustrate an example of a system 600 that may be used to perform a search in which images are returned as search results based on patterns drawn on a display 602 of a user device. The display 602 may be, for example, the display of the user device 110 that presents to the user a search application interface showing the search term and associated search results on the display 602. As shown by the FIGS. 6A-6F, the user may draw patterns on the display 602 to enter the search term. The system 600 recognizes characters corresponding to the user-entered patterns, and may suggest search terms 604 that include the recognized character. The user may select one of the suggested search terms if that matches the user's intended search query, or the user may ignore the suggested search terms and continue to enter characters for the search term by drawing patterns on the display. The search application may provide an option to the user to disable the suggested search terms by selecting the icon 608.

Using the characters that are recognized based on the user-drawn patterns as the search term, the system 600 returns thumbnails of images 606 as search results. As the user draws more patterns, the system 600 recognizes more characters, updates the suggested search terms to include the newly recognized characters, and returns updated search results that include thumbnails of images 610 matching the updated search term. The thumbnails of images and the search term are presented by the search application interface on the display 602.

FIGS. 7A-7H illustrate an example of a system 700 that may be used to perform a search in which the search term and search results are updated based on patterns drawn on a display 702 of a user device. The display 702 may be, for example, the display of the user device 110 that presents to the user a search application interface showing the search term and associated search results on the display 702. As shown by the FIGS. 7A-7H, the user may draw patterns on the display 702 to enter the search term. The system 700 recognizes characters corresponding to the user-entered patterns, and may suggest search terms 704 that include the recognized character. The user may select one of the suggested search terms if that matches the user's intended search query, or the user may ignore the suggested search terms and continue to enter characters for the search term by drawing patterns on the display.

Figure 7:
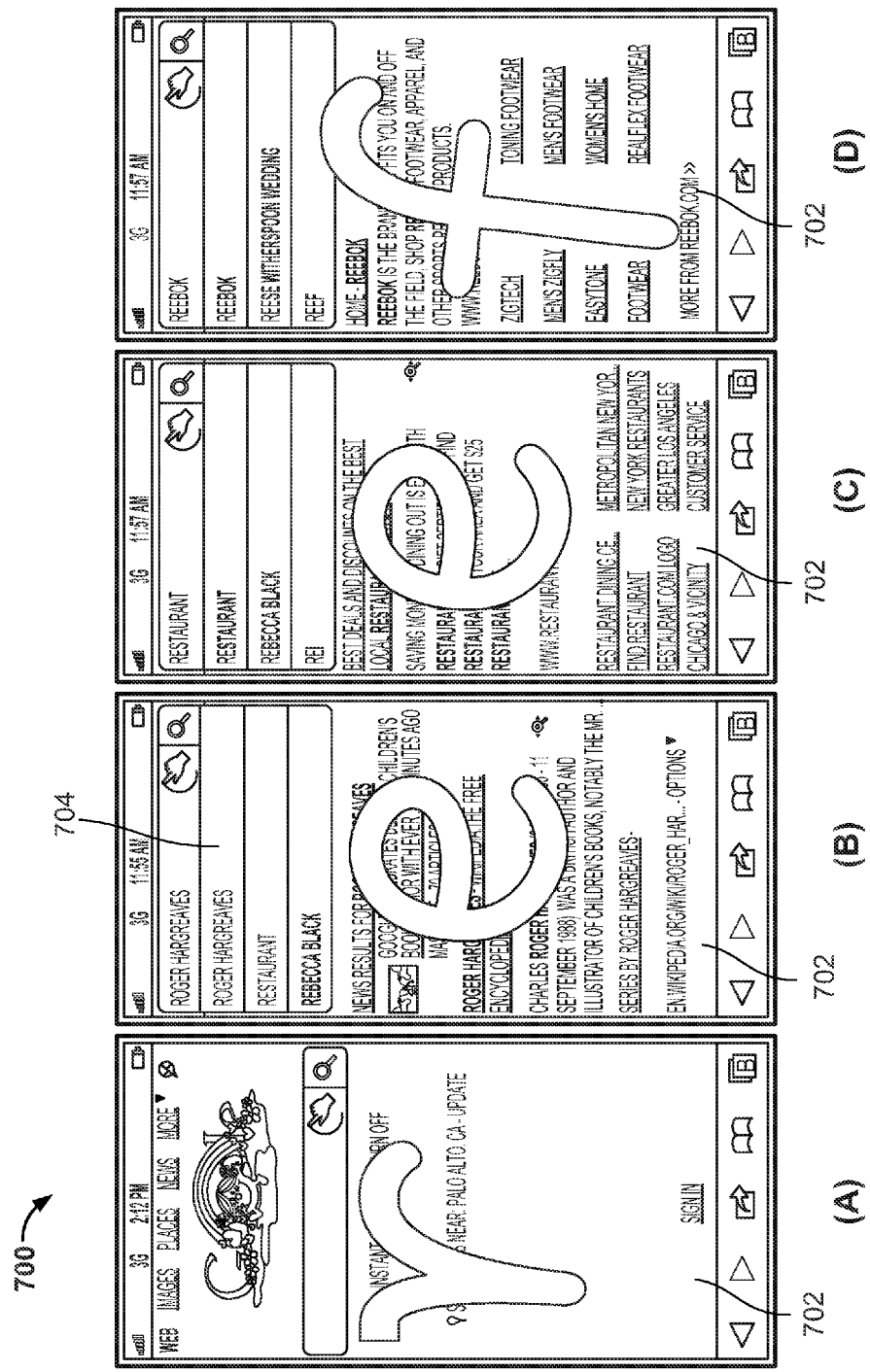
FIGS. 7A-7H illustrate an example of a system that may be used to perform a search in which the search term and search results are updated based on patterns drawn on a display of a user device.
Figure 7:
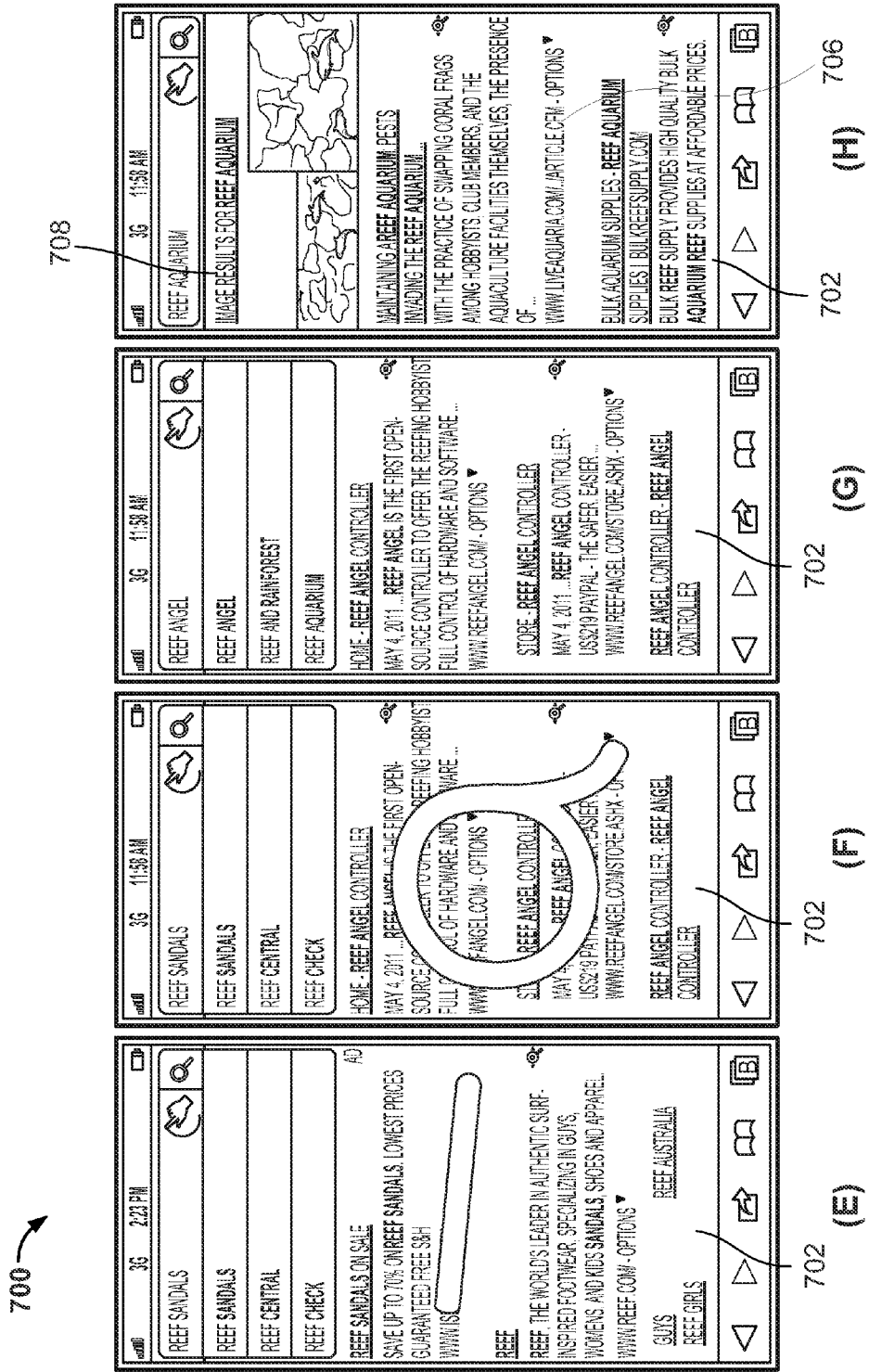

Using the characters that are recognized based on the user-drawn patterns as the search term, the system 700 returns search results. As the user draws more patterns, the system 700 recognizes more characters, updates the suggested search terms to include the newly recognized characters, and returns updated search results. As shown in FIG. 7H, the search results may include both text-based links 706 to web pages matching the search term and also thumbnails of images 708 that match the search term. Both the text-based links and the thumbnails of images are presented together by the search application interface on the display 702.

Figure 8:
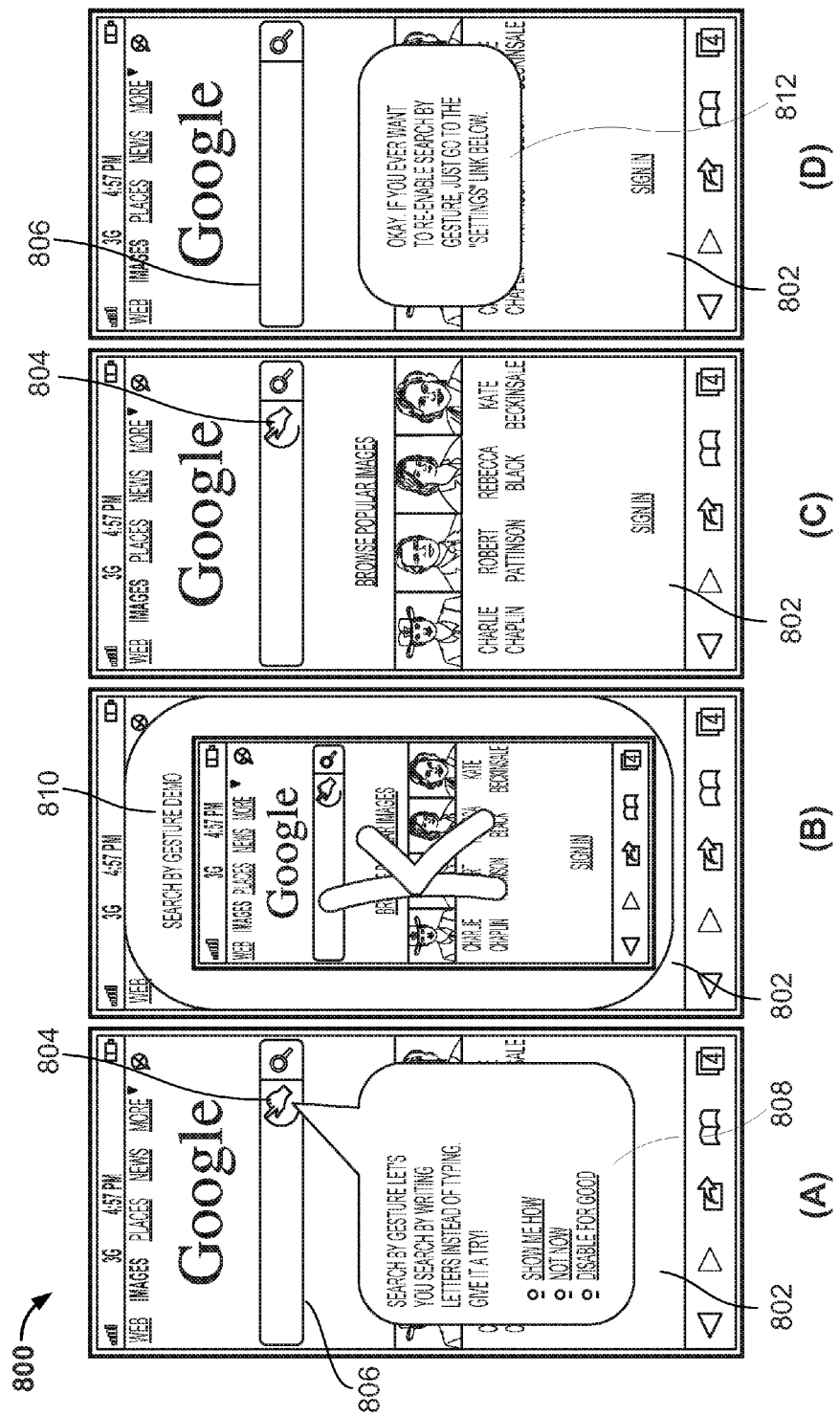
FIGS. 8A-8D illustrate an example of system in which gestures on a display of a user device for performing a search may be enabled or disabled by selecting an icon on the search application interface.

FIGS. 8A-8D illustrates an example of system 800 in which gestures on a display 802 of a user device for performing a search may be enabled or disabled by selecting an icon on the search application interface. The display 802 may be, for example, the display of the user device 110 that presents to the user a search application interface showing the search term and associated search results on the display 802. As shown in FIGS. 8A and 8C, the search application may provide an icon 804 in the search box 806 to indicate that search by gesture is enabled. The search application may provide an option 808 to the user to disable search based on gestures. If the user opts to disable search based on gestures, the icon 804 disappears from the search box 806, as shown in FIG. 8D. However, the search application may provide instructions 812 on the interface that indicates how search by gesture may be re-enabled by modifying the settings of the search application.

In some implementations, the search application also may provide a demonstration 810 on how to perform a search by gesture, as shown in FIG. 8B. The demonstration 810 may aid a user to understand how to perform a search using gestures, e.g., by drawing patterns on the display 802 to enter characters corresponding to the search term.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The exemplary implementations described above use characters from the English alphabet. In other implementations the characters may be characters from non-English alphabets, or non-alphabetical symbols.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving, by a search system, (i) a pixel map corresponding to one or more characters that have been drawn on a display of a client device and (ii) data identifying one or more other characters that were previously recognized by the search system using one or more other pixel maps;
   recognizing, by the search system, the one or more characters that correspond to the pixel map based on the received pixel map and the one or more other characters;
   formulating, by the search system, a search that includes the one or more characters and the one or more other characters as a query term; and
   communicating, by the search system, (i) one or more search results for the search, (ii) data identifying the one or more characters that correspond to the received pixel map, and (iii) data identifying the one or more other characters to the client device that were previously recognized by the search system using the one or more other pixel maps.

2. The method of claim 1, wherein the pixel map is received before a user of the client device initiates the search.

3. The method of claim 1, wherein the pixel map (i) identifies points on the display on which the one or more characters were drawn, and (ii) specifies a sequence in which the points on the display were drawn.

4. The method of claim 1, wherein the search comprises an instant search.

5. The method of claim 1, wherein the search comprises an image search.

6. A system comprising:
   one or more computers and one or more storage devices storing instructions that are operable, when executed by the one or more computers, to cause the one or more computers to perform operations comprising:
   receiving, by a search system, (i) a pixel map corresponding to one or more characters that have been drawn on a display of a client device and (ii) data identifying one or more other characters that were previously recognized by the search system using one or more other pixel maps;
   recognizing, by the search system, the one or more characters that correspond to the pixel map based on the received pixel map and the one or more other characters;
   formulating, by the search system, a search that includes the one or more characters and the one or more other characters as a query term; and
   communicating, by the search system, (i) one or more search results for the search, (ii) data identifying the one or more characters that correspond to the received pixel map, and (iii) data identifying the one or more other characters to the client device that were previously recognized by the search system using the one or more other pixel maps.

7. The system of claim 6, wherein the pixel map is received before a user of the client device initiates the search.

8. The system of claim 6, wherein the pixel map (i) identifies points on the display on which the one or more characters were drawn, and (ii) specifies a sequence in which the points on the display were drawn.

9. The system of claim 6, wherein the search comprises an instant search.

10. The system of claim 6, wherein the search comprises an image search.

11. A non-transitory computer-readable medium storing software comprising instructions executable by one or more computers, which, upon such execution, cause the one or more computers to perform operations comprising:
    receiving, by a search system, (i) a pixel map corresponding to one or more characters that have been drawn on a display of a client device and (ii) data identifying one or more other characters that were previously recognized by the search system using one or more other pixel maps;
    recognizing, by the search system, the one or more characters that correspond to the pixel map based on the received pixel map and the one or more other characters;
    formulating, by the search system, a search that includes the one or more characters and the one or more other characters as a query term; and
    communicating, by the search system, (i) one or more search results for the search, (ii) data identifying the one or more characters that correspond to the received pixel map, and (iii) data identifying the one or more other characters to the client device that were previously recognized by the search system using the one or more other pixel maps.

12. The computer-readable medium of claim 11, wherein the pixel map is received before a user of the client device initiates the search.

13. The computer-readable medium of claim 11, wherein the pixel map (i) identifies points on the display on which the one or more characters were drawn, and (ii) specifies a sequence in which the points on the display were drawn.

14. The computer-readable medium of claim 11, wherein the search comprises an instant search.

15. The computer-readable medium of claim 11, wherein the search comprises an image search.

* * * * *